United States Patent
Park et al.

(10) Patent No.: US 10,106,423 B2
(45) Date of Patent: Oct. 23, 2018

(54) METHOD FOR PREPARING ULTRAHIGH-PURITY SILICON CARBIDE POWDER

(71) Applicant: KOREA INSTITUTE OF SCIENCE AND TECHNOLOGY, Seoul (KR)

(72) Inventors: Sang Whan Park, Seoul (KR); Mi Rae Youm, Seoul (KR); Sung Il Youn, Seoul (KR); Gyoung Sun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 239 days.

(21) Appl. No.: 15/072,724

(22) Filed: Mar. 17, 2016

(65) Prior Publication Data

US 2017/0073233 A1    Mar. 16, 2017

(30) Foreign Application Priority Data

Sep. 14, 2015    (KR) .......................... 10-2015-0129506

(51) Int. Cl.
*C01B 21/06* (2006.01)
*C01B 31/36* (2006.01)

(52) U.S. Cl.
CPC .......... *C01B 31/36* (2013.01); *C01P 2004/51* (2013.01); *C01P 2004/60* (2013.01)

(58) Field of Classification Search
None
See application file for complete search history.

(56) References Cited

U.S. PATENT DOCUMENTS

| | | | |
|---|---|---|---|
| 4,702,900 | A | 10/1987 | Kurachi et al. |
| 5,863,325 | A | 1/1999 | Kanemoto et al. |
| (Continued) | | | |

FOREIGN PATENT DOCUMENTS

| | | |
|---|---|---|
| KR | 10-2011-0021530 A | 3/2011 |
| KR | 10-1116755 B1 | 2/2012 |
| (Continued) | | |

OTHER PUBLICATIONS

Google translation of Park et al. Mar. 28, 2018.*
(Continued)

*Primary Examiner* — Guinever S Gregorio
(74) *Attorney, Agent, or Firm* — NSIP Law (57) ABSTRACT

The present invention relates to a method for preparing an ultrahigh-purity silicon carbide powder, more particularly to a method for preparing an ultrahigh-purity silicon carbide granular powder by preparing a gel wherein a silicon compound and a carbon compound are uniformly dispersed via a sol-gel process using a liquid state silicon compound and a solid or liquid state carbon compound of varying purities as raw materials, preparing a silicon dioxide-carbon ($SiO_2$—C) composite by pyrolyzing the prepared gel, preparing a silicon carbide-silicon dioxide-carbon ($SiC$—$SiO_2$—C) composite powder via two-step carbothermal reduction of the prepared silicon dioxide-carbon composite, adding a silicon metal and then conducting carbonization and carbothermal reduction at the same time by heat treating, thereby growing the synthesized silicon carbide particle with an increased yield of the silicon carbide.

16 Claims, 2 Drawing Sheets

(56) References Cited

U.S. PATENT DOCUMENTS

| | | |
|---|---|---|
| 6,627,169 B1 | 9/2003 | Itoh et al. |
| 2009/0220788 A1 | 9/2009 | Barrett et al. |
| 2013/0243682 A1* | 9/2013 | Park .................. C01B 32/956 |
| | | 423/346 |

FOREIGN PATENT DOCUMENTS

| | | |
|---|---|---|
| KR | 101116755 B1 * | 2/2012 |
| KR | 10-2013-0072067 A | 7/2013 |
| KR | 10-2013-0122476 A | 11/2013 |
| KR | 10-2014-0042602 A | 4/2014 |
| WO | WO 2014/061898 A1 | 4/2014 |

OTHER PUBLICATIONS

Jo, Yung-Chul, et al. "Effects of Metallic Silicon on the Synthsis of β-SiC Powders by a Carbothermal Reduction Using SiO 2-C Hybrid Precursor Fabricated by a Sol-gel Process." Journal of the Korean Ceramic Society 50.6 (2013): 402-409. (8 pages in Korean with English abstract).

* cited by examiner

METHOD FOR PREPARING ULTRAHIGH-PURITY SILICON CARBIDE POWDER

CROSS-REFERENCE TO RELATED APPLICATIONS

This application claims, under 35 U.S.C. § 119, the priority of Korean Patent Application No. 10-2015-0129506, filed on Sep. 14, 2015, in the Korean Intellectual Property Office, the disclosure of which is incorporated herein by reference in its entirety.

BACKGROUND (a) Technical Field

The present invention relates to a method for preparing ultrahigh-purity silicon carbide (SiC) powders, more particularly to a method for preparing ultrahigh-purity silicon carbide granular powders by preparing a gel wherein a silicon compound and a carbon compound are uniformly dispersed via a sol-gel process using a liquid state silicon compound and a solid or liquid state carbon compound, which have varying purities, as raw materials, preparing a silicon dioxide-carbon ($SiO_2$—C) composite by pyrolyzing the prepared gel, preparing silicon carbide-silicon dioxide-carbon (SiC—$SiO_2$—C) composite powders via two-step carbothermal reduction processes of the prepared silicon dioxide-carbon composite, adding a silicon metal and then conducting both the direct reaction between the silicon metal and carbon and carbothermal reduction at the same time by heat treating, thereby growing the synthesized silicon carbide particles with a high yield.

(b) Background Art

Silicon carbide (SiC) is a non-oxide-based ceramic material. Since it exhibits superior properties including oxidation resistance, corrosion resistance, wear resistance, thermal shock resistance, high-temperature strength, etc. due to the strong covalent bond between silicon and carbon, it is widely used as a structural material for high-temperature applications. In general, SiC has been mainly used as abrasives, heating elements, refractory materials, etc. Furthermore, the importance of SiC as a core material for high-temperature industries has been widely accepted because of its superior high-temperature stability and chemical resistance.

Recently, materials with large band gap and high dielectric breakdown property are required in the power semiconductor market to reduce the size of a device and to minimize the power loss. In this regard, SiC is recognized as the optimal material for high-output power devices and power devices for high temperature applications.

With its excellent thermal properties as well as superior semiconductor/electrical properties, SiC single crystals can replace Si single crystal for high power semiconductors of which the maximum operation temperature is 250° C. SiC single crystals are suitable for semiconductor devices operating under harsh environments because they are chemically stable, strongly resistant to radiation, and so forth. Also in the LED industry, SiC single crystals are used as an LED substrate for growing GaN. Accordingly, demand on ultrahigh-purity SiC single crystals is increasing with the expanding LED market.

Methods for growing SiC single crystals include a liquid phase epitaxy (LPE) method of growing SiC single crystals from a Si melt, a CVD method and a physical vapor transport (PVT) method. At present, 6-inch SiC wafers manufactured by the PVT method are commercially available. For the growth of SiC single crystals by the PVT method, high-purity SiC granular powders are used. The ultrahigh-purity SiC powders are supplied exclusively by specific companies involved in SiC single crystal manufacturers and there is no open market established for the ultrahigh-purity SiC powders.

Korean Patent Publication No. 10-2011-0021530 (patent document 1) discloses a technology of mixing a solid silica and a solid carbon source and synthesizing high-purity SiC powders by conducting the carbothermal reduction at 1600-1900° C. to manufacture high-purity SiC granular powders used for preparation of SiC single crystals by the PVT method. The International Patent Publication No. WO 2014-061898 (patent document 2) discloses a technology of synthesizing high-purity α-phase SiC granular powders having an average particle size of 75-110 μm and containing less than 10 ppm of impurities by heat-treating high-purity SiC powders prepared as described above at 2000-2200° C. under an inert atmosphere. And, US Patent Publication No. 2009-0220788 (patent document 3) discloses a technology of synthesizing ultrahigh-purity α-phase SiC granular powders containing extremely low contents of nitrogen, boron and aluminum by heat-treating a silicon metal and a high-purity solid carbon at 1200° C. under a vacuum atmosphere for 12 hours and then raising temperature to 2250° C. at a pressure of $10^{-5}$ torr or lower. However, the methods presented in the patent documents 2 and 3 are disadvantageous in that the cost of powder synthesis is increased because the heat treatment is conducted at high temperatures of 2000-2250° C. and that a synthesis yield is low because the granular powders are obtained through β to α phase transition.

U.S. Pat. No. 4,702,900 (patent document 4) discloses a technology of synthesizing β-phase ultrahigh-purity SiC granular powders by preparing a silicon dioxide-carbon precursor from a silicon alkoxide and a carbon compound and heat-treating under a vacuum condition or an inert gas condition such as argon (Ar). And, U.S. Pat. No. 5,863,325 (patent document 5) discloses a heat treatment process optimized for using high-purity β-phase SiC granular powders containing metal impurities of several ppm prepared as described above as a source for single crystals. In the patent document 5, after the β-phase SiC powders are prepared at 1800° C., the powders are treated through 3-6 thermal cycles at 1900-2100° C. to grow the particle size to around 200 μm. However, because of long heat treatment time, the production cost of the SiC powders is high.

U.S. Pat. No. 6,627,169 (patent document 6) discloses a technology of controlling the average particle size of β-phase SiC powders by measuring the amount of CO gas generated during carbothermal reduction. Although SiC powders synthesized in the patent document 6 are of ultrahigh purity containing metal impurities at a concentration of 0.01 ppm or lower, synthesis yield of SiC powders is low compared with that of starting source materials.

In addition, Korean Patent Publication No. 10-2013-0122476 (patent document 7) discloses a method of manufacturing SiC powders by heat-treating a silicon source such as $SiO_2$, Si, silica sol, etc. and a carbon source such as a phenol resin, sugar, a polymer, etc. at various temperature ranges. And, Korean Patent Publication No. 10-2013-0072067 (patent document 8) discloses a method of manufacturing SiC powders by preparing SiC powder compacts by compressing fine SiC powders, preparing SiC powders aggregate by crushing the same, and then preparing SiC granular powders with a size control by heat-treating the same.

However, it is difficult to economically prepare SiC powders with high purity using the above-described existing methods.

REFERENCES OF THE RELATED ART

Patent Documents (Patent document 1) Korean Patent Publication No. 10-2011-0021530.
(Patent document 2) International Patent Publication No. WO 2014-061898.
(Patent document 3) US Patent Publication No. 2009-0220788.
(Patent document 4) U.S. Pat. No. 4,702,900.
(Patent document 5) U.S. Pat. No. 5,863,325.
(Patent document 6) U.S. Pat. No. 6,627,169.
(Patent document 7) Korean Patent Publication No. 10-2013-0122476.
(Patent document 8) Korean Patent Publication No. 10-2013-0072067.

SUMMARY

In order to solve the problems of the existing technologies, the present invention aims at economically preparing ultrahigh-purity SiC granular powders with a high yield.

The present invention is directed to providing a method for economically preparing ultrahigh-purity SiC granular powders with a high yield.

The present invention is also directed to providing a method for preparing ultrahigh-purity β-phase SiC granular powders having a narrow particle size distribution and various particle sizes with a high yield from a $SiO_2$—C composite prepared from a liquid state silicon compound and a liquid or solid [0015] state carbon compound, which have various purities via a sol-gel process and a pyrolysis process.

The present invention provides a method for preparing SiC powders, including:
preparing a gel by mixing a liquid-state silicon compound and a carbon compound in a liquid state and conducting hydrolysis and gelation via a sol-gel process;
preparing a silicon dioxide-carbon composite by pyrolyzing the prepared gel;
preparing silicon carbide-silicon dioxide-carbon composite powders via partial carbothermal reduction of the prepared silicon dioxide-carbon composite; and
preparing SiC granular powders by adding a silicon metal to the silicon carbide-silicon dioxide-carbon composite powders and facilitating the growth of the synthesized SiC particles while conducting the direct reaction between the silicon metal and carbon and additional carbothermal reduction at the same time.

In the present invention, a liquid state silicon compound and a solid or liquid state carbon compound are used as starting source materials for preparing ultrahigh-purity SiC powders. Accordingly, mixing the starting source materials in a liquid state is relatively easy to get a homogeneous mixture. And, when the liquid starting source materials are used, inclusion of impurities may be prevented easily during the mixing process of the source materials, and ultrahigh-purity SiC granular powders may be prepared by changing the condition of heat treatment depending on the selected starting source materials with various purities.

In the present invention, the solid or liquid state carbon compound may be used as a starting source material. The solid carbon compound may be dissolved in ethanol or methanol or water and then mixed with the liquid state silicon compound. And, the liquid state carbon compound may be directly mixed with the liquid state silicon compound. Since the carbon source and the silicon source can be uniformly mixed in the prepared gel using the above mentioned method, a silicon dioxide-carbon ($SiO_2$—C) composite wherein the carbon source and silicon source are uniformly distributed can be prepared via pyrolysis of the gel. Also, silicon carbide-silicon dioxide-carbon (SiC—$SiO_2$—C) composite powders, in which synthesized SiC particles, unreacted silicon dioxide, and unreacted carbon are uniformly distributed, can be prepared via partial carbothermal reduction of the prepared $SiO_2$—C composite under various heat treatment conditions depending on the purity of the starting source materials.

In addition, ultrahigh-purity SiC granular powders can be synthesized with a high yield using 60% or greater of the volume of a heating zone in a graphite reactor by loading the prepared SiC—$SiO_2$—C composite powders together with a silicon metal in a graphite crucible with a high packing density, and then conducting the direct reaction between the silicon metal and carbon and additional carbothermal reduction at the same time.

Furthermore, ultrahigh-purity SiC granular powders can be synthesized by changing heating rate, synthesis temperature and heating time during the partial carbothermal reduction in the step of preparing the SiC—$SiO_2$—C composite powders depending on the purity of the starting source materials and by changing heating rate, synthesis temperature and heating time via both of the direct reaction between the silicon metal and carbon and the additional carbothermal reduction between the unreacted silicon dioxide and carbon in the step of preparing the SiC granular powders.

In particular, the β-phase SiC granular powders synthesized according to the present invention have a narrow particle size distribution. Since the ultra high purity β-phase SiC granular powders with size of 100 μm or greater can be synthesized even at temperatures of 1800° C. or below, the operation life time of a high-purity graphite heating element and a graphite insulator in a vacuum graphite furnace can be extended. In addition, because the high-purity SiC granular powders can be synthesized with a high yield using 60% or greater of the volume of a heating zone in a graphite reactor, the production cost of the ultrahigh-purity SiC granular powders can be decreased.

DETAILED DESCRIPTION

Hereinafter, the present invention is described in more detail through exemplary embodiments.

The present invention relates to a method for economically preparing ultrahigh-purity SiC granular powders having a narrow particle size distribution and various particle sizes with a high yield using a SiO$_2$—C composite prepared from a liquid silicon source and a carbon source, which have various purities, via a sol-gel process and a pyrolysis process.

In an exemplary embodiment of the present invention, ultrahigh-purity SiC powders are prepared by a step of preparing a gel using a liquid state silicon compound and a carbon compound in liquid state, a step of preparing a silicon dioxide-carbon (SiO$_2$—C) composite, a step of preparing silicon carbide-silicon dioxide-carbon (SiC—SiO$_2$—C) composite powders via partial carbothermal reduction and, finally, a step of preparing SiC granular powders by adding a silicon metal to the prepared silicon carbide-silicon dioxide-carbon (SiC—SiO$_2$—C) composite powders and growing the initially synthesized SiC particles while conducting both the direct reaction between the silicon metal and carbon and additional carbothermal reduction at the same time.

In an exemplary embodiment of the present invention, a liquid state silicon compound and a solid state carbon compound, which have various purities, are mixed in liquid state after the solid state carbon compound is dissolved and a gel in which the silicon compound and the carbon compound are uniformly dispersed is prepared via a sol-gel process and then a silicon dioxide-carbon composite is prepared via pyrolysis. After loading the prepared SiO$_2$—C composite in a graphite crucible, SiC—SiO$_2$—C composite powders are prepared via a two-step carbothermal reduction in a graphite vacuum furnace. Then, a silicon metal is added to the prepared SiC—SiO$_2$—C composite powders, and then the SiC—SiO$_2$—C composite powders with the added silicon metal are loaded in the graphite crucible with a high packing density, and ultrahigh-purity β-phase SiC granular powders can be synthesized with a high yield via both of a direct reaction between an carbon and the silicon metal and additional carbothermal reduction between an unreacted silicon dioxide and carbon, thereby facilitating growth of the synthesized SiC particles.

In an exemplary embodiment of the present invention, the starting source materials used to synthesize the ultrahigh-purity SiC granular powders may be a silicon compound and a carbon compound containing 0.1 wt % or less of metal impurities, and the silicon metal used as a silicon source material for the direct reaction with carbon in the synthesis of the SiC powders may be specifically silicon metal powders or a silicon metal piece having a purity of 99.9999 wt % or higher.

In an exemplary embodiment of the present invention, the gel is prepared by first mixing the liquid state silicon compound and the carbon compound as the starting source materials in liquid state, next conducting hydrolysis and then gelation via a sol-gel process.

In an exemplary embodiment of the present invention, in the step of preparing the gel, after a liquid sol is formed by mixing and stirring a liquid state silicon compound and a liquid state carbon compound, a gel wherein the silicon compound and the carbon compound are uniformly mixed may be prepared by adding an aqueous solution, as a catalyst, prepared by mixing a predetermined amount of an acid or a base with distilled water so that hydrolysis and gelation of the silicon compound are facilitated.

In an exemplary embodiment of the present invention, the liquid state silicon compound may be one or more silicon source selected from silicon mono($C_1$-$C_4$ alkoxide), silicon di($C_1$-$C_4$ alkoxide), silicon tri($C_1$-$C_4$ alkoxide), silicon tetra ($C_1$-$C_4$ alkoxide) and polyethyl silicate and the carbon compound may be one or more carbon source selected from a disaccharide selected from sucrose, maltose and lactose and a phenol resin, and a gel wherein the silicon source and the carbon source are uniformly mixed may be prepared. Specifically, the silicon compound may be silicon tetraethoxide (or tetraethyl orthosilicate) and the carbon compound may be a novolac-type phenol resin.

In an exemplary embodiment of the present invention, when mixing the starting source materials, a carbon/silicon (C/Si) molar ratio may be specifically 1.6-4.0. When the carbon/silicon molar ratio is lower than 1.6, the synthesis yield of SiC decreases rapidly. And, when the carbon/silicon molar ratio exceeds 4.0, the synthesis of small-sized SiC particles is increased due to a reaction between the excess carbon source and the silicon metal, resulting in a broad particle size distribution of the synthesized SiC powders. The amount of the carbon compound may be determined based on the amount of carbon remaining after the pyrolysis and the amount of the silicon atom in the liquid state silicon compound. That is to say, the amount of the carbon compound required for the synthesis of the ultrahigh-purity SiC granular powders is specifically based on the amount of carbon remaining after the pyrolysis of the carbon compound and may be 1.6-4.0 mol per 1 mol of the silicon atom in the liquid state silicon compound. As a solvent used to dissolve the solid carbon source material, an alcohol and/or water may be used in an amount of 10 mol or less per 1 mol of the silicon atom in the liquid state silicon compound.

In an exemplary embodiment of the present invention, when mixing the liquid state silicon compound and the liquid state carbon compound, a Teflon-coated mixing device, which includes low metal impurities, e.g., a Teflon container, a Teflon-coated mixing device, a Teflon-coated appliance, a Teflon-coated impeller, etc., may be used. Specifically, the gel containing both the silicon compound and the carbon compound may be prepared by stirring at 50-400 RPM and at 20-60° C. for 6 hours to one week.

In an exemplary embodiment of the present invention, the gel containing both the silicon compound and the carbon compound may be prepared using one or more acid selected from nitric acid, hydrochloric acid, oxalic acid, maleic acid, acrylic acid, acetic acid and toluenesulfonic acid or one or more base selected from ammonia water and hexamethylenetetramine as a catalyst for the hydrolysis and gelation of the silicon compound.

In an exemplary embodiment of the present invention, the catalyst for the hydrolysis and gelation of the silicon compound may be an aqueous solution of an acid or a base, a molar ratio of the acid or base being 0.2 or smaller, specifically 0.001-0.2, and a molar ratio of water being 10 or smaller, specifically 0.1-10, based on the silicon (Si) element in the silicon compound.

In an exemplary embodiment of the present invention, the gel prepared from the liquid state silicon compound and the liquid state carbon compound as the starting source materials may be pulverized and classified into powders using equipment such as sieve, crusher, and container prepared using a material-including low metals or metal compounds impurities, e.g., Teflon, polyethylene, polyvinyl chloride, etc., and a Teflon-coated sieve. Specifically, the prepared gel may be loaded in a Teflon-coated container or Teflon container and then dried at 40-150° C. for 1 hour or longer (specifically for 1-72 hours) to prepare a dried gel wherein the silicon compound and the carbon compound are uniformly distributed.

In accordance with the present invention, a silicon dioxide-carbon composite is prepared by pyrolyzing the prepared gel.

In an exemplary embodiment of the present invention, after loading the dried gel containing the silicon compound and the carbon compound in a high-purity quartz crucible or a high-purity graphite crucible containing metal impurities other than silicon at low concentrations, a silicon dioxide-carbon ($SiO_2$—C) composite may be prepared by conducting pyrolysis in a high-purity quartz reactor under a nitrogen, argon or vacuum ($10^0$ torr or lower) atmosphere at 800-1000° C. for 0.5-5 hours by heating at a rate of 1-10° C./min.

In accordance with the present invention, silicon carbide-silicon dioxide-carbon composite powders are prepared by conducting partial carbothermal reduction of the prepared silicon dioxide-carbon composite.

In an exemplary embodiment of the present invention, after loading the prepared $SiO_2$—C composite in a high-purity graphite crucible containing metal impurities other than silicon at low concentrations, silicon carbide-silicon dioxide-carbon (SiC—$SiO_2$—C) composite powders may be prepared by conducting carbothermal reduction in a high-purity graphite vacuum furnace under a vacuum ($10^0$ torr or lower) atmosphere at 1300-1400° C. for 1-5 hours by heating at a rate of 1-10° C./min and then further conducting carbothermal reduction at 1500-1700° C. for 1-10 hours by heating at a rate of 5-20° C./min.

In accordance with the present invention, SiC granular powders are prepared by adding a silicon metal to the silicon carbide-silicon dioxide-carbon (SiC—$SiO_2$—C) composite powders then conducting both the direct reaction between the silicon metal and carbon and additional carbothermal reduction between a silicon dioxide and carbon, thereby facilitating growth of the synthesized SiC particles.

In an exemplary embodiment of the present invention, after the prepared SiC—$SiO_2$—C composite powders are uniformly mixed with a silicon metal and loaded in a graphite crucible with a high packing density, ultrahigh-purity SiC granular powders may be prepared by conducting both a direct reaction between the silicon metal and carbon and carbothermal reduction between the unreacted silicon dioxide and carbon at the same time in a high-purity graphite vacuum furnace under an argon or vacuum ($10^0$ torr or lower) atmosphere at 1500-1800° C. by heating at a rate of 1-20° C./min.

In accordance with the present invention, the direct reaction between the silicon metal and the unreacted carbon, carbothermal reduction between the unreacted silicon dioxide and the unreacted carbon, and carbothermal reduction between gaseous silicon monoxide produced from the reaction between the silicon metal and the unreacted silicon dioxide and the unreacted carbon occur in the vacuum furnace and, at the same time, the growth of the synthesized SiC particles occurs. As a result, the ultrahigh-purity β-phase SiC granular powders are prepared. Specifically, the silicon metal that may remain in the prepared ultrahigh-purity SiC granular powders may be removed using a mixture of nitric acid and hydrofluoric acid.

In an exemplary embodiment of the present invention, a direct reaction between the silicon metal and carbon and additional carbothermal reduction of the SiC—$SiO_2$—C composite powders with the added silicon metal are conducted at the same time. During the reaction between the SiC—$SiO_2$—C composite powders and the added silicon metal, ultrahigh-purity SiC granular powders having a narrow particle size distribution and various average particle sizes may be prepared by changing the heating rate in a range from 1 to 20° C./min, the synthesis temperature in a range from 1500 to 1800° C., and heating time in a range from 1 to 5 hours.

In an exemplary embodiment of the present invention, the silicon metal may be added in an amount of 100-500% of the moles of the unreacted carbon in the silicon carbide-silicon dioxide-carbon composite powders, and the silicon metal may be silicon metal powders or a silicon metal piece having a purity of 99.9999 wt % or higher. The SiC—$SiO_2$—C composite powders and the silicon metal are uniformly mixed and loaded in a high-purity graphite crucible with a high packing density. After the synthesis reaction, the weight of the synthesized SiC powders may be 90% or greater than the weight of the SiC—$SiO_2$—C composite powders.

In an exemplary embodiment of the present invention, the SiC powders may be β-phase SiC powders having an average particle size of 30-200 μm, with a uniform particle size with a particle size distribution ($d_{90}/d_{10}$) of 5.0 or smaller, and containing 1 ppm or less of metal impurities in the synthesized SiC powders.

In accordance with the present invention, ultrahigh-purity SiC granular powders having various particle sizes and a narrow particle size distribution can be synthesized with a high yield.

As described above, because a liquid state silicon compound and a solid or liquid state carbon compound are used as starting source materials in the method for preparing SiC powders according to the present invention, the starting source materials can be mixed easily without contaminants. In particular, when liquid state starting source materials are used, inclusion of impurities can be prevented during the mixing of the source materials.

And, in accordance with the present invention, ultrahigh-purity SiC granular powders may be prepared using starting source materials having various purities by changing the heat treatment condition.

In the present invention, since, as the starting source materials, the solid carbon compound used as being dissolved in ethanol or methanol or the liquid carbon compound is mixed with the liquid state silicon compound, the carbon compound and the silicon compound can be uniformly mixed in the prepared gel and a high-purity $SiO_2$—C composite wherein the silicon source and the carbon source are uniformly distributed can be prepared through carbonization Also, in accordance with the present invention, ultrahigh-purity SiC granular powders can be synthesized with a high yield using 60% or greater, specifically 70% or greater, of the volume of a heating zone in a graphite reactor by loading the prepared SiC—$SiO_2$—C composite powders together with a silicon metal in a graphite crucible with a high packing density, and then conducting both the carbothermal reduction and direct reaction among the silicon metal, silicon dioxide, and carbon at the same time.

Accordingly, the production cost of the ultrahigh-purity SiC granular powders can be decreased.

The SiC granular powders synthesized according to the present invention have a narrow particle size distribution. In addition, since high-purity SiC granular powders of 100 μm or greater can be synthesized at temperatures of 1800° C. or below, although the synthesis of high-purity SiC granular powders was possible only at temperatures of 2200° C. or higher with the existing methods, the operation life time of a high-purity graphite heating element and a graphite insulator in a vacuum graphite furnace can be extended In addition, in accordance with the present invention, high-purity β-phase SiC granular powders of 6N (99.9999 wt. %) or higher may be manufactured by using starting source materials with lower purity than 6N (99.9999 wt. %).

EXAMPLES

The present invention will be described in more detail through examples. However, the scope of this invention is not limited by the examples.

Example 1

For preparation of ultrahigh-purity SiC powders, tetraethyl orthosilicate (TEOS) containing 10 ppm or less of metal impurities was used as a liquid silicon source and a solid phenol resin (novolac-type) containing 100 ppm of metal impurities was used as a carbon source. The amount of the phenol resin was determined such that the C/Si molar ratio based on the silicon source in TEOS was 2.3-3.0 in consideration of the carbon remaining after heat treatment. The phenol resin was dissolved in 4 mol of ethanol based on the silicon element in a Teflon-coated container and stirred at room temperature at 300 RPM using a magnetic stirrer after adding 1 mol of TEOS. The sufficiently mixed TEOS-phenol resin mixture was gelated at room temperature by adding an aqueous nitric acid solution of 0.07 mol of nitric acid and 4 mol of water based on the silicon element. The prepared gel was pulverized in a Teflon container and then dried at 100° C. for 24 hours.

The dried gel was first put in a high-purity graphite crucible, next loaded in a quartz reactor, then heat-treated under a nitrogen gas atmosphere at 900° C. for 3 hours by heating at a rate of 5° C./min to prepare a silicon dioxide-carbon ($SiO_2$—C) composite.

The prepared $SiO_2$—C composite was put in a graphite crucible, next was loaded in a graphite furnace, and then underwent carbothermal reduction during the heat treatment at a rate of 10° C./min under a vacuum atmosphere ($10^{-2}$ torr) and maintaining temperature at 1400° C. for 2 hours. Then, additional carbothermal reduction was conducted by heating at a rate of 20° C./min and maintaining temperature at 1500° C. for 3 hours to prepare silicon carbide-silicon dioxide-carbon (SiC—$SiO_2$—C) composite powders.

The prepared SiC—$SiO_2$—C composite powders and silicon metal powders (average particle size: 5 mm, purity: 99.9999 wt % or higher) were uniformly mixed. The mixed powders were put in a high-purity graphite crucible with a high packing density, and then heated to 1600~1800° C. at the rate of 2 to 10° C./min and maintained at the temperature for 3 hours under vacuum atmosphere to synthesize high purity SiC granular powders. Here, the amount of silicon metal powders, which were mixed into the prepared SiC—$SiO_2$—C composite powders, corresponds to a molar ratio of 120-300% based on the moles of unreacted carbon in the SiC—$SiO_2$—C composite powders.

Examples 2-4

The C/Si molar ratio of the starting source materials used in the synthesis of the SiC powders in Example 1 was changed to 1.6, 2.5 and 3.0, respectively. To prepare a SiC—$SiO_2$—C composite powders, the $SiO_2$—C composite was maintained at 1400° C. for 2 hours and then underwent the carbothermal reduction at 1500° C. for 3 hours by heating at a rate of 20° C./min. After adding a silicon metal corresponding to a molar ratio of 150% based on the moles of unreacted carbon in the SiC—$SiO_2$—C composite powders, ultrahigh-purity SiC powders were synthesized by heating at a rate of 10° C./min and maintaining temperature at 1600° C. for 3 hours.

The average particle size of the prepared SiC powders increased from 30 μm, to 40 μm and 55 μm as the C/Si molar ratio in the starting source materials increased from 1.6 to 2.5 and 3.0 respectively. A relatively broad particle size distribution ($d_{90}/d_{10}$) of 3.5-3.9 was obtained for the synthesized SiC powders. XRD analysis revealed that the synthesized SiC powders were β crystalline phase SiC. As the C/Si molar ratio increased from 1.6 to 3.0, the synthesis yield increased from 91% to 96% based on the weight of the SiC—$SiO_2$—C composite powders. The purity of the synthesized SiC powders was analyzed by GDMS. The synthesized SiC powders had a purity of 99.9999-99.99994 wt %.

Examples 5-6

The C/Si molar ratio of the starting source materials used in the synthesis of the SiC powders in Example 1 was changed to 2.3 and 3.0, respectively. To prepare SiC—$SiO_2$—C composite powders, the $SiO_2$—C composite was maintained at 1400° C. for 2 hours and then subjected to carbothermal reduction at 1500° C. for 3 hours by heating at a rate of 20° C./min under vacuum atmosphere. After adding a silicon metal, which corresponds to a molar ratio of 200% based on the moles of unreacted carbon in the SiC—$SiO_2$—C composite powders, ultrahigh-purity SiC powders were synthesized by heating at a rate of 10° C./min and maintaining temperature at 1700° C. for 3 hours under vacuum atmosphere.

When observed by SEM, the synthesized SiC powders had a cubic shape. When the C/Si molar ratio of the starting source materials was 2.3, the average particle size and the particle size distribution of the synthesized SiC powders were 60 μm and 3.2, respectively. When the C/Si molar ratio of the starting source materials was 3.0, the average particle size and the particle size distribution of the synthesized SiC powders were changed to 75 μm and 2.8, respectively. And, the synthesis yield was 92% and 95% based on the weight of the SiC—$SiO_2$—C composite powders when the C/Si molar ratio was 2.3 and 3.0, respectively. The purity of the synthesized SiC powders was analyzed by GDMS. The synthesized SiC powders had a purity of 99.99992-99.99996 wt %.

Example 7

The C/Si molar ratio of the starting source materials used in the synthesis of the SiC powders in Example 1 was fixed to 3.0. To prepare SiC—$SiO_2$—C composite powders, the $SiO_2$—C composite was maintained at 1400° C. for 2 hours and then underwent carbothermal reduction at 1500° C. for 3 hours by heating at a rate of 20° C./min under vacuum atmosphere. After adding a silicon metal corresponding to a molar ratio of 250% based on the moles of unreacted carbon in the SiC—$SiO_2$—C composite powders, ultrahigh-purity SiC powders were synthesized by heating at a rate of 10° C./min and maintaining temperature at 1800° C. for 3 hours under vacuum atmosphere. After etching the residual silicon metal using a mixture of hydrofluoric acid and nitric acid, the synthesized SiC powders were washed with water and dried.

The average particle size and the particle size distribution of the synthesized SiC powders were 110 μm and 2.5, respectively, and the synthesis yield was 95% based on the weight of the SiC—SiO$_2$—C composite powders. The purity of the synthesized SiC powders was analyzed by GDMS. The synthesized SiC powders had a purity of 99.99999-99.999995 wt %.

Example 8

The C/Si molar ratio of the starting source materials used in the synthesis of the SiC powders in Example 1 was fixed to 3.0. To prepare SiC—SiO$_2$—C composite powders, the SiO$_2$—C composite was maintained at 1400° C. for 2 hours and then subjected to carbothermal reduction at 1500° C. for 3 hours by heating at a rate of 20° C./min under vacuum atmosphere. After adding a silicon metal corresponding to a molar ratio of 250% based on the moles of unreacted carbon in the SiC—SiO$_2$—C composite powders, ultrahigh-purity SiC powders were synthesized by heating at a rate of 2° C./min and maintaining temperature at 1800° C. for 3 hours under vacuum atmosphere. After etching the residual silicon metal using a mixture of hydrofluoric acid and nitric acid, the synthesized SiC powders was washed with water and dried.

The average particle size and the particle size distribution of the synthesized SiC powders were 140 μm and 2.3, respectively, and the synthesis yield was 96% based on the weight of the SiC—SiO$_2$—C composite powders. The purity of the synthesized SiC powders was analyzed by GDMS. The synthesized SiC powders had a purity of 99.999992-99.999995 wt %.

Example 9

For preparation of ultrahigh-purity SiC powders, polyethyl silicate containing 1000 ppm of metal impurities was used as a liquid silicon source and a solid phenol resin (novolac-type) containing 100 ppm of metal impurities was used as a carbon source. The C/Si molar ratio of the starting source materials was 3.0. A silicon dioxide-carbon (SiO$_2$—C) composite wherein the silicon source and the carbon are uniformly distributed was prepared in the same manner as in Example 1.

The prepared SiO$_2$—C composite was put in a graphite crucible and, after loading in a graphite furnace, carbothermal reduction was conducted by heating at a rate of 10° C./min under a vacuum atmosphere (10$^{-2}$ torr) and maintaining temperature at 1400° C. for 4 hours. And then, additional carbothermal reduction was conducted by heating at a rate of 20° C./min and maintaining temperature at 1500 or 1600° C. for 3 hours to prepare silicon carbide-silicon dioxide-carbon (SiC—SiO$_2$—C) composite powders.

The prepared SiC—SiO$_2$—C composite powders and silicon metal powders (average particle size: 5 mm, purity: 99.9999 wt % or higher) were uniformly mixed. The mixed powders were put in a high-purity graphite crucible with a high packing density, and then heated to 1600 to 1800° C. at the rate of 2 to 10° C./min, and maintained at the temperature for 3 hours under vacuum atmosphere to synthesize high purity SiC granular powders. Here, the amount of silicon metal powders, which were mixed into the prepared SiC—SiO$_2$—C composite powders, corresponds to a molar ratio of 200% based on the moles of unreacted carbon in the SiC—SiO$_2$—C composite powders.

Example 10

To prepare SiC—SiO$_2$—C composite powders, the SiO$_2$—C composite of Example 9 was maintained at 1400° C. for 4 hours and then underwent carbothermal reduction at 1500° C. for 3 hours by heating at a rate of 20° C./min. Ultrahigh-purity SiC powders were synthesized by heating at a rate of 10° C./min and maintaining temperature at 1800° C. for 3 hours.

After first carbothermal reduction and second carbothermal reduction was conducted at 1400° C. and 1500° C. respectively, the prepared SiC—SiO$_2$—C composite powders were mixed with silicon metal powders (average particle size: 5 mm, purity: 99.9999 wt % or higher), which correspond to a molar ratio of 200% based on the moles of unreacted carbon in the SiC—SiO$_2$—C composite powders. The mixture of SiC—SiO$_2$—C composite and the silicon metal was put in a high-purity graphite crucible, and then heated to 1800° C. at the rate of 10° C./min and maintained at the temperature for 3 hours to synthesize high purity SiC granular powders.

The synthesis yield was 96% based on the weight of the SiC—SiO$_2$—C composite powders. The average particle size and the particle size distribution of the synthesized SiC powders were 90 μm and 3.2, respectively. The purity of the synthesized SiC granular powders was analyzed by GDMS. The synthesized SiC powders had a purity of 99.99992 wt %.

Example 11

To prepare SiC—SiO$_2$—C composite powders, the SiO$_2$—C composite of Example 9 was maintained at 1400° C. for 4 hours and then subjected to carbothermal reduction at 1600° C. for 3 hours by heating at a rate of 20° C./min. Ultrahigh-purity SiC powders were synthesized by adding a silicon metal to the prepared SiC—SiO$_2$—C composite powders and heating at a rate of 10° C./min and maintaining temperature at 1800° C. for 3 hours under vacuum atmosphere.

After first carbothermal reduction, and second carbothermal reduction was conducted at 1400° C. and 1600° C. respectively. The prepared SiC—SiO$_2$—C composite powders and silicon metal powders (average particle size: 5 mm, purity: 99.9999 wt % or higher) were uniformly mixed. The mixed powders were put in a high-purity graphite crucible with a high packing density, and then heated to 1600 to 1800° C. at the rate of 2 to 10° C./min, and maintained at the temperature for 3 hours under vacuum atmosphere to synthesize high purity SiC granular powders. Here, the amount of silicon metal powders, which were mixed to the prepared SiC—SiO$_2$—C composite powders, corresponds to a molar ratio of 200% based on the moles of unreacted carbon in the SiC—SiO$_2$—C composite powders.

The synthesis yield was 96% based on the weight of the SiC—SiO$_2$—C composite powders. The average particle size and the particle size distribution of the synthesized SiC powders were 110 μm and 2.4, respectively. The purity of the synthesized SiC granular powders was analyzed by GDMS. The synthesized SiC powders had a purity of 99.99997 wt %.

Example 12

For preparation of ultrahigh-purity SiC powders, tetraethyl orthosilicate (TEOS) having a purity of 99.99% was used as a liquid silicon source and a solid phenol resin (novolac-type) having a purity of 99% was used as a carbon source. The C/Si molar ratio of the starting source materials was 3.0. A silicon dioxide-carbon (SiO$_2$—C) composite wherein the silicon source and the carbon are uniformly distributed was prepared in the same manner as in Example 1.

The prepared $SiO_2$—C composite was put in a graphite crucible and loaded in a graphite furnace, and then carbothermal reduction was conducted by heating at a rate of 10° C./min under a vacuum atmosphere ($10^{-2}$ torr) and maintaining temperature at 1400° C. for 4 hours. Then, additional carbothermal reduction was conducted by heating at a rate of 20° C./min and maintaining temperature at 1700° C. for 8 hours to prepare silicon carbide-silicon dioxide-carbon (SiC—$SiO_2$—C) composite powders.

The prepared SiC—$SiO_2$—C composite powders were loaded in a graphite crucible after adding silicon metal powders (average particle size=5 mm, purity=99.9999 wt % or higher), which correspond to a molar ratio of 200% based on the moles of unreacted carbon in the prepared SiC—$SiO_2$—C composite powders, and ultrahigh-purity SiC granular powders was synthesized by heating at a rate of 10° C./min and maintaining temperature at 1800° C. for 3 hours.

The synthesis yield of the prepared SiC powders was 96% based on the weight of the SiC—$SiO_2$—C composite powders. The average particle size was 90 μm and the particle size distribution was relatively broad as 4.6. The purity of the synthesized SiC granular powders was analyzed by GDMS. The synthesized SiC powders had a purity of 99.9999 wt %.

Example 13

For preparation of ultrahigh-purity SiC powders, tetraethyl orthosilicate (TEOS) having a purity of 99% was used as a liquid state silicon source and a solid phenol resin (novolac-type) having a purity of 99.99% was used as a solid state carbon source. The C/Si molar ratio of the starting source materials was 3.0. A silicon dioxide-carbon ($SiO_2$—C) composite wherein the silicon source and the carbon are uniformly distributed was prepared in the same manner as in Example 1.

The prepared $SiO_2$—C composite was put in a graphite crucible and loaded in a graphite furnace, carbothermal reduction was conducted by heating at a rate of 10° C./min under a vacuum atmosphere ($10^{-2}$ torr) and maintaining temperature at 1400° C. for 4 hours. Then, additional carbothermal reduction was conducted by heating at a rate of 20° C./min and maintaining temperature at 1700° C. for 9 hours to prepare silicon carbide-silicon dioxide-carbon (SiC—$SiO_2$—C) composite powders.

The prepared SiC—$SiO_2$—C composite powders were loaded in a graphite crucible after adding silicon metal powders (average particle size=5 mm, purity=99.9999 wt % or higher), which correspond to a molar ratio of 200% based on the moles of unreacted carbon in the prepared SiC—$SiO_2$—C composite powders, and ultrahigh-purity SiC granular powders were synthesized by heating at a rate of 10° C./min and maintaining temperature at 1800° C. for 3 hours.

The synthesis yield of the prepared SiC powders was 97% based on the weight of the SiC—$SiO_2$—C composite powders. The average particle size was 95 μm and the particle size distribution ($d_{90}/d_{10}$) was relatively broad as 4.5. The purity of the synthesized SiC granular powders was analyzed by GDMS. The synthesized SiC granular powders had a purity of 99.99993 wt %.

Example 14

For preparation of ultrahigh-purity SiC powders, tetraethyl orthosilicate (TEOS) containing 10 ppm or less of metal impurities was used as a liquid silicon source and a solid phenol resin (novolac-type) containing 1 ppm of metal impurities was used as a carbon source. The C/Si molar ratio of the starting source materials was 3.0. A silicon dioxide-carbon ($SiO_2$—C) composite wherein the silicon source and the carbon are uniformly distributed was prepared in the same manner as in Example 1.

The prepared $SiO_2$—C composite was put in a graphite crucible and, after loading in a graphite furnace, carbothermal reduction was conducted by heating at a rate of 10° C./min under a vacuum atmosphere ($10^{-2}$ torr) and maintaining temperature at 1400° C. for 1 hour. Then, additional carbothermal reduction was conducted by heating at a rate of 20° C./min and maintaining temperature at 1600° C. for 3 hours to prepare silicon carbide-silicon dioxide-carbon (SiC—$SiO_2$—C) composite powders.

The prepared SiC—$SiO_2$—C composite powders were loaded in a graphite crucible after adding silicon metal powders (average particle size=5 mm, purity=99.9999 wt % or higher), which correspond to a molar ratio of 200% based on the moles of unreacted carbon in the prepared SiC—$SiO_2$—C composite powders, and ultrahigh-purity SiC granular powders were synthesized by heating at a rate of 2° C./min and maintaining temperature at 1800° C. for 3 hours.

The synthesis yield of the prepared SiC powders was 98% based on the weight of the SiC—$SiO_2$—C composite powders. The average particle size was 140 μm and the particle size distribution ($d_{90}/d_{10}$) was 3.0. The purity of the synthesized SiC granular powders was analyzed by GDMS. The synthesized SiC powders had a purity of 99.999995-99.999997 wt %.

Test Example

Figure 1:
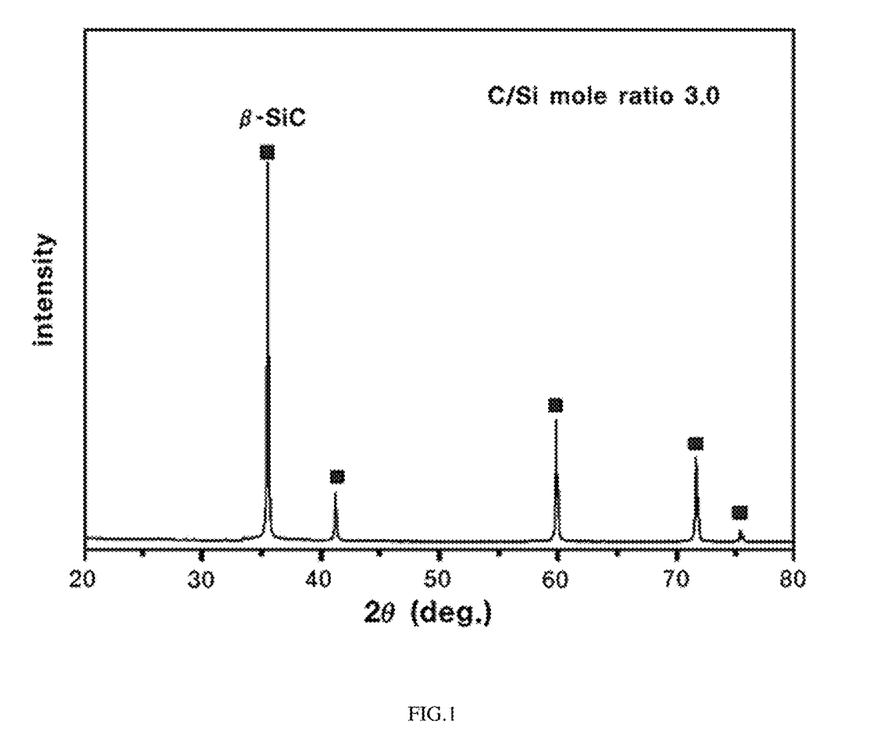
FIG. 1 shows a result of analyzing the X-ray diffraction pattern of ultrahigh-purity SiC granular powders according to the present invention prepared in Example 6 (C/Si molar ratio of starting source materials=3.0).

The X-ray diffraction pattern of the ultrahigh-purity SiC granular powders prepared in Example 6 from the silicon dioxide-carbon ($SiO_2$—C) composite prepared with the C/Si molar ratio of the starting source materials controlled to be 3.0 was analyzed. The result is shown in FIG. 1. It was identified that β-phase SiC was synthesized.

Figure 2:
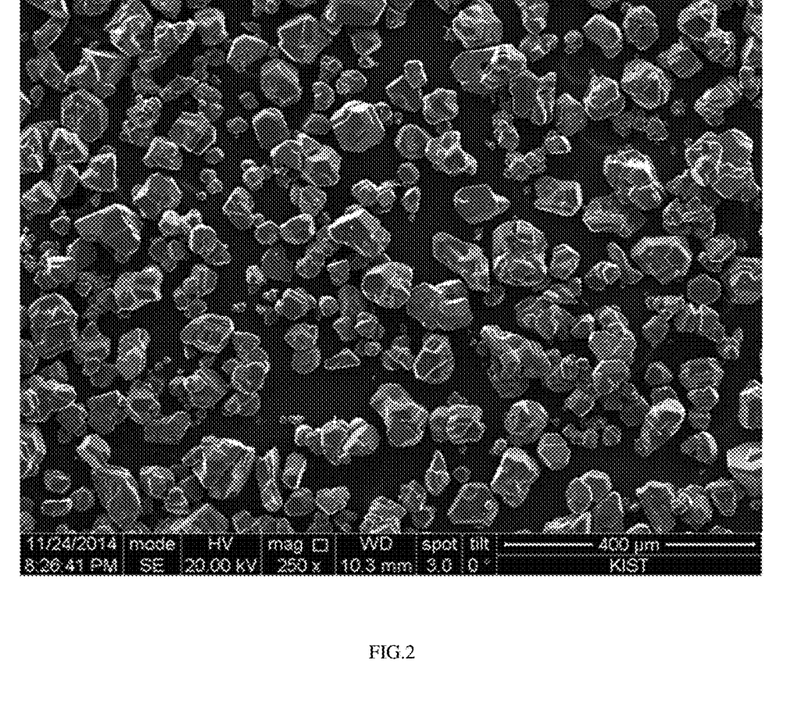
FIG. 2 shows the scanning electron microstructure of ultrahigh-purity SiC granular powders according to the present invention prepared in Example 6 (C/Si molar ratio of starting source materials=3.0).

Also, the morphology of the ultrahigh-purity SiC granular powders synthesized in Example 6 was imaged using an electron microscope (×200). From the SEM image shown in FIG. 2, it was confirmed that cubic-shaped SiCgranular powders were synthesized.

The ultrahigh-purity SiC powders prepared by the method for preparing SiC powders according to the present invention can be widely used as a core material for the preparation of high-purity SiC processing components for next-generation semiconductors and LEDs and for the preparation of SiC single crystals for power semiconductors.

What is claimed is:
1. A method for preparing a silicon carbide powder, comprising:
    preparing a gel by mixing a liquid state silicon compound and a carbon compound in liquid state and conducting hydrolysis and gelation via a sol-gel process;
    preparing a silicon dioxide-carbon composite by pyrolyzing the prepared gel;
    preparing a silicon carbide-silicon dioxide-carbon composite powder via partial carbothermal reduction of the prepared silicon dioxide-carbon composite under a vacuum at 1300-1400° C.; and
    preparing a silicon carbide granular powder by adding a silicon metal to the silicon carbide-silicon dioxide-carbon composite powder and facilitating growth of synthesized silicon carbide particles while conducting a direct reaction and an additional carbothermal reduction at 1500-1700° C. with a heating rate of 5-20° C./min.

2. The method for preparing the silicon carbide powder according to claim 1, wherein, in the preparing of the gel, after a liquid sol is formed by mixing and stirring a liquid state silicon compound and a liquid state carbon compound, a gel in which the silicon compound and the carbon compound are mixed is prepared by adding an aqueous acid or base solution that facilitates hydrolysis and gelation of the silicon compound.

3. The method for preparing the silicon carbide powder according to claim 1, wherein
the liquid state silicon compound comprises one or more silicon sources selected from the group consisting of silicon mono($C_1$-$C_4$ alkoxide), silicon di($C_1$-$C_4$ alkoxide), silicon tri($C_1$-$C_4$ alkoxide), silicon tetra($C_1$-$C_4$ alkoxide), and polyethyl silicate, and
the carbon compound comprises one or more carbon sources selected from the group consisting of sucrose, maltose, lactose, and a phenol resin.

4. The method for preparing the silicon carbide powder according to claim 1, wherein, in the preparing of the gel, the silicon compound and the carbon compound are used with a carbon/silicon (C/Si) molar ratio of 1.6-4.0.

5. The method for preparing the silicon carbide powder according to claim 1, wherein, in the preparing of the gel, the liquid state silicon compound and the liquid state carbon compound are mixed using a Teflon-coated mixing device and the gel comprising the silicon compound, and the carbon compound is prepared by stirring at 50-400 RPM and at 20-60° C. for 6 hours to one week.

6. The method for preparing the silicon carbide powder according to claim 1, wherein, in the preparing of the gel, the gel comprising the silicon compound and the carbon compound is prepared using one or more acid selected from the group consisting of nitric acid, hydrochloric acid, oxalic acid, maleic acid, acrylic acid, acetic acid, and toluenesulfonic acid, or one or more bases selected from the group consisting of ammonia water and hexamethylenetetramine as a catalyst for the hydrolysis and gelation of the silicon compound.

7. The method for preparing the silicon carbide powder according to claim 6, wherein the catalyst for the hydrolysis and gelation of the silicon compound comprises an aqueous solution of an acid or a base, a molar ratio of the acid or base being 0.2 or smaller and a molar ratio of water being 10 or smaller based on the silicon (Si) element in the silicon compound.

8. The method for preparing the silicon carbide powder according to claim 1, wherein, in the preparing of the gel, the prepared gel is pulverized, classified, and dried at 40-150° C. for 1-72 hours to prepare a dried gel in which the silicon compound and the carbon compound are uniformly distributed.

9. The method for preparing the silicon carbide powder according to claim 1, wherein the preparing of the silicon dioxide-carbon composite comprises conducting pyrolysis of the gel under a nitrogen, argon, or vacuum atmosphere at 800-1000° C. for 0.5-5 hours with a heating rate of 1-10° C./min.

10. The method for preparing the silicon carbide powder according to claim 1, wherein the partial carbothermal reduction is performed for 1-5 hours with a heating rate of 1-10° C./min, and the additional carbothermal reduction is performed for 1-10 hours.

11. The method for preparing the silicon carbide powder according to claim 1, wherein the additional carbothermal reduction is performed under an argon or vacuum atmosphere with a heating rate of 1-20° C./min.

12. The method for preparing the silicon carbide powder according to claim 11, wherein, during the reaction, which is between the silicon carbide-silicon dioxide-carbon composite powder and the silicon metal, the silicon carbide granular powder is prepared by changing the heating rate in a range within the 1-20° C./min.

13. The method for preparing the silicon carbide powder according to claim 1, wherein, in the preparing of the silicon carbide granular powder, the silicon metal is added in an amount of 100-500% of moles of unreacted carbon in the silicon carbide-silicon dioxide-carbon composite powder, and the silicon metal comprises either one of a silicon metal powder and a silicon metal piece having a purity of 99.9999 wt % or higher.

14. The method for preparing the silicon carbide powder according to claim 1, wherein the silicon carbide granular powder comprises a β-phase silicon carbide powder having an average particle size of 30-200 μm, a particle size distribution ($d_{90}/d_{10}$) of 5.0 or smaller, and 1 ppm or less of metal impurities.

15. A method for preparing a silicon carbide powder, comprising:
preparing a gel by mixing a liquid state silicon compound and a carbon compound in liquid state and conducting hydrolysis and gelation via a sol-gel process;
preparing a silicon dioxide-carbon composite by pyrolyzing the prepared gel;
preparing a silicon carbide-silicon dioxide-carbon composite powder via partial carbothermal reduction of the prepared silicon dioxide-carbon composite; and
preparing a silicon carbide granular powder by adding a silicon metal to the silicon carbide-silicon dioxide-carbon composite powder and facilitating growth of synthesized silicon carbide particles while simultaneously conducting a direct reaction and an additional carbothermal reduction,
wherein the partial carbothermal reduction is performed under a vacuum atmosphere at 1300-1400° C. for 1-5 hours with a heating rate of 1-10° C./min, and the additional carbothermal reduction is performed at 1500-1700° C. for 1-10 hours with a heating rate of 5-20° C./min.

16. A method for preparing a silicon carbide powder, comprising:
preparing a gel by mixing a liquid state silicon compound and a carbon compound in liquid state and conducting hydrolysis and gelation via a sol-gel process;
preparing a silicon dioxide-carbon composite by pyrolyzing the prepared gel;
preparing a silicon carbide-silicon dioxide-carbon composite powder via partial carbothermal reduction of the prepared silicon dioxide-carbon composite; and
preparing a silicon carbide granular powder by adding a silicon metal to the silicon carbide-silicon dioxide-carbon composite powder in an amount of 100-500% of moles of unreacted carbon in the silicon carbide-silicon dioxide-carbon composite powder and facilitating growth of synthesized silicon carbide particles while conducting a direct reaction and an additional carbothermal reduction, wherein the silicon metal is a silicon metal powder or a silicon metal piece having a purity of 99.9999 wt % or higher.

* * * * *